United States Patent
Kawai et al.

(10) Patent No.: US 11,155,706 B2
(45) Date of Patent: Oct. 26, 2021

(54) POLYMER COMPOSITION AND TIRE

(71) Applicant: JSR Corporation, Minato-ku (JP)

(72) Inventors: Junji Kawai, Minato-ku (JP); Hiroyuki Morita, Minato-ku (JP); Yusuke Amano, Minato-ku (JP); Noriko Mashimo, Minato-ku (JP); Takaomi Matsumoto, Minato-ku (JP)

(73) Assignee: JSR Corporation, Minato-ku (JP)

( * ) Notice: Subject to any disclaimer, the term of this patent is extended or adjusted under 35 U.S.C. 154(b) by 227 days.

(21) Appl. No.: 16/420,937

(22) Filed: May 23, 2019

(65) Prior Publication Data

US 2019/0367722 A1 Dec. 5, 2019

(30) Foreign Application Priority Data

May 29, 2018 (JP) .............................. JP2018-102030

(51) Int. Cl.
*C08L 47/00* (2006.01)
*B60C 1/00* (2006.01)
*B60C 11/00* (2006.01)
*C08J 3/20* (2006.01)

(52) U.S. Cl.
CPC ............ *C08L 47/00* (2013.01); *B60C 1/0016* (2013.01); *B60C 11/0008* (2013.01); *C08J 3/203* (2013.01); *B60C 2011/0025* (2013.01); *C08L 2205/025* (2013.01); *C08L 2205/03* (2013.01)

(58) Field of Classification Search
CPC ............... C08L 47/00; C08L 2205/025; C08L 2205/03; B60C 1/0016; B60C 11/0008; C08J 3/203

USPC .......................................................... 524/526
See application file for complete search history.

(56) References Cited

U.S. PATENT DOCUMENTS

2005/0065265 A1* 3/2005 Zanzig ...................... C08L 9/00
524/445
2018/0117967 A1* 5/2018 Higa ........................ C08L 21/00

FOREIGN PATENT DOCUMENTS

WO WO 2016/194316 A1 12/2016

OTHER PUBLICATIONS

Extended European Search Report dated Oct. 7, 2019 in corresponding European Patent Application No. 19176200.4, 7 pages.

* cited by examiner

*Primary Examiner* — Doris L Lee
(74) *Attorney, Agent, or Firm* — Oblon, McClelland, Maier & Neustadt, L.L.P.

(57) ABSTRACT

A polymer composition including: a filler (A); a polymer (B) having a repeating unit derived from a conjugated diene compound, having a peak temperature of a tan δ temperature dispersion curve of −110° C. or more and less than −30° C., and having a functional group capable of interacting with the filler (A); and a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A), wherein the polymer (B) and the polymer (C) are incompatible with each other, and a concentration of functional groups per unit mass of the polymer (B) is higher than a concentration of functional groups per unit mass of the polymer (C).

12 Claims, 1 Drawing Sheet

POLYMER COMPOSITION AND TIRE

Japanese Patent Application No. 2018-102030, filed on May 29, 2018, is hereby incorporated by reference in their entirety.

BACKGROUND OF THE INVENTION

The present invention relates to a polymer composition, a method for producing the same, and a tire produced by using the polymer composition.

In recent years, the demand for reducing fuel consumption of automobiles has been increasing in connection with the movement for global carbon dioxide emission regulations associated with the growing interest in environmental issues. In order to meet such a demand, reduction in rolling resistance is also required for tire performance. Conventionally, optimization of a tire structure has been studied as a method for reducing the rolling resistance of a tire, but use of polymer compositions suitable for tires that have a low tan δ (hereinafter referred to as "low loss property") and excel in a low heat generation property is currently also practiced as a general method.

It is conceivable to reduce the amount of filler such as carbon black and silica or use carbon black having a large particle diameter, but either of these methods inevitably reduces the reinforcing property, abrasion resistance and grip property on wet road surfaces (hereinafter referred to as "wet grip property") of the polymer composition.

Therefore, for example, a study has been conducted to provide a rubber composition suitable for producing a tire having both a low loss property and abrasion resistance by blending rubbers having different glass transition temperatures (Tg) (see, for example, WO 2016/194316).

However, when using the rubber composition disclosed in WO 2016/194316, there is a problem that sufficient performance cannot be obtained in terms of the wet grip property and mechanical properties.

SUMMARY

The invention can provide a polymer composition suitable for producing a tire that is excellent in the low loss property and abrasion resistance and also has excellent balance of wet grip performance and mechanical properties. The invention can also provide a tire that is excellent in the low loss property and abrasion resistance and also has excellent balance of wet grip performance and mechanical properties.

According to a first aspect of the invention, there is provided a polymer composition including:
a filler (A);
a polymer (B) having a repeating unit derived from a conjugated diene compound, having a peak temperature of a tan δ temperature dispersion curve of −110° C. or more and less than −30° C., and having a functional group capable of interacting with the filler (A); and
a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A),
the polymer (B) and the polymer (C) being incompatible with each other, and
a concentration of functional groups per unit mass of the polymer (B) being higher than a concentration of functional groups per unit mass of the polymer (C).

According to a second aspect of the invention, there is provided a tire in which the above polymer composition is used for a tread member.

According to a third aspect of the invention, there is provided a method for producing a polymer composition including:
a first step of kneading
a filler (A),
a polymer (B) having a repeating unit derived from a conjugated diene compound, having a peak temperature of a tan δ temperature dispersion curve of −110° C. or more and less than −30° C., and having a functional group capable of interacting with the filler (A), and
a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A); and
a second step of adding and kneading a crosslinking agent to the kneaded product of the first step,
the polymer (B) having a number average molecular weight (Mn) of from 80,000 to 400,000 and including from 70% by mass to 100% by mass of the repeating unit derived from the conjugated diene compound and from 0% by mass to 30% by mass of the repeating unit derived from the aromatic vinyl compound, when the total number of repeating units is taken as 100% by mass, and
the polymer (C) having a number average molecular weight (Mn) of from 200,000 to 1,500,000, and including from 50% by mass to 80% by mass of the repeating unit derived from the conjugated diene compound and from 20% by mass to 50% by mass of the repeating unit derived from the aromatic vinyl compound, when the total number of repeating units is taken as 100% by mass.

DETAILED DESCRIPTION OF THE EMBODIMENT

Figure 1:
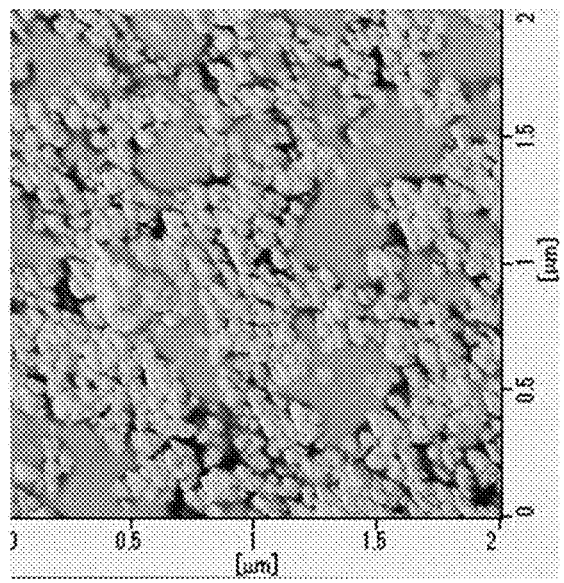
FIG. 1 is an atomic force microscope (AFM) image of a rubber elastic body prepared in Example 1.

The invention has been accomplished to solve at least some of the above-mentioned problems and can be realized as the following embodiments.

According to one embodiment of the invention, there is provided a polymer composition including:
a filler (A);
a polymer (B) having a repeating unit derived from a conjugated diene compound, having a peak temperature of a tan δ temperature dispersion curve of −110° C. or more and less than −30° C., and having a functional group capable of interacting with the filler (A); and
a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A),
the polymer (B) and the polymer (C) being incompatible with each other, and a concentration of functional groups per unit mass of the polymer (B) being higher than a concentration of functional groups per unit mass of the polymer (C).

In the polymer composition, the number average molecular weight (Mn) of the polymer (C) may be higher than a number average molecular weight (Mn) of the polymer (B).

In the polymer composition, the number average molecular weight (Mn) of the polymer (B) may be from 80,000 to 400,000, and the number average molecular weight (Mn) of the polymer (C) may be from 200,000 to 1,500,000.

In the polymer composition, the functional group capable of interacting with the filler (A) may be at least one functional group selected from a group consisting of a nitrogen-containing functional group, a silicon-containing functional group, and an oxygen-containing functional group.

In the polymer composition, the polymer (C) may have a branched structure.

In the polymer composition, the filler (A) may be present in a larger amount in a phase having a low tan δ peak temperature than in a phase having a high tan δ peak temperature.

In the polymer composition, the polymer (B) may include from 70% by mass to 100% by mass of the repeating unit derived from the conjugated diene compound and from 0% by mass to 30% by mass of the repeating unit derived from the aromatic vinyl compound, when the total number of repeating units is taken as 100% by mass.

In the polymer composition, the polymer (C) may include from 50% by mass to 80% by mass of the repeating unit derived from the conjugated diene compound and from 20% by mass to 50% by mass of the repeating unit derived from the aromatic vinyl compound, when the total number of repeating units is taken as 100% by mass.

In the polymer composition, the conjugated diene compound may be 1,3-butadiene.

In the polymer composition, the aromatic vinyl compound may be styrene.

In the polymer composition, the polymer (C) may have a molecular weight distribution (Mw/Mn) of 1.5 to 2.5.

According to one embodiment of the invention, there is provided a tire in which the above polymer composition is used for a tread member.

According to one embodiment of the invention, there is provided a method for producing a polymer composition including:

a first step of kneading a filler (A), a polymer (B) having a repeating unit derived from a conjugated diene compound, having a peak temperature of a tan δ temperature dispersion curve of −110° C. or more and less than −30° C., and having a functional group capable of interacting with the filler (A), and a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A); and a second step of adding and kneading a crosslinking agent to the kneaded product of the first step, the polymer (B) having a number average molecular weight (Mn) of from 80,000 to 400,000 and including from 70% by mass to 100% by mass of the repeating unit derived from the conjugated diene compound and from 0% by mass to 30% by mass of the repeating unit derived from the aromatic vinyl compound, when the total number of repeating units is taken as 100% by mass, and the polymer (C) having a number average molecular weight (Mn) of from 200,000 to 1,500,000, and including from 50% by mass to 80% by mass of the repeating unit derived from the conjugated diene compound and from 20% by mass to 50% by mass of the repeating unit derived from the aromatic vinyl compound, when the total number of repeating units is taken as 100% by mass.

With the abovementioned polymer composition, it is possible to produce a tire which excels not only in the low loss property and abrasion resistance but also in effective balance between the wet grip performance and mechanical properties.

Hereinafter, preferred embodiments of the invention will be described in detail. It is to be understood that the invention is not limited to only the embodiments described below, but also includes various modifications that can be implemented within the spirit of the invention.

1. Polymer Composition

The polymer composition according to one embodiment of the invention includes a filler (A); a polymer (B) having a repeating unit derived from a conjugated diene compound, a peak temperature of a tan δ temperature dispersion curve of −110° C. or more and less than −30° C., and a functional group capable of interacting with the filler (A); and a polymer (C) having a repeating unit derived from a conjugated diene compound and a repeating unit derived from an aromatic vinyl compound, a peak temperature of a tan δ temperature dispersion curve of −30° C. or more and 10° C. or less, and a functional group capable of interacting with the filler (A), wherein the polymer (B) and the polymer (C) are incompatible with each other, and a concentration of functional groups per unit mass of the polymer (B) is higher than a concentration of functional groups per unit mass of the polymer (C).

The polymer composition according to one embodiment of the invention includes the polymer (B) and the polymer (C) as the polymer components, but may also include another polymer. In the present specification, a combination of the polymer (B), the polymer (C) and another polymer is referred to as a "polymer component". In addition, the polymer composition according to one embodiment of the invention may include at least one kind, or two or more kinds of the polymer (B) and the polymer (C).

In the polymer composition according to one embodiment of the invention, the polymer (B) and the polymer (C) are incompatible with each other and phase separation occurs. "Incompatible", as referred to herein, means that when the cross-section of the vulcanized rubber is observed by TEM, SEM, AFM, etc., a phase separation structure is observed, and in the case of a non-continuous phase, the average circle-equivalent radius is 50 nm or more, and in the case of a continuous phase, the average width is 50 nm or more. Since both the polymer (B) and the polymer (C) have a functional group capable of interacting with the filler (A), the filler (A) is likely to be unevenly distributed to the polymer (B) phase or the polymer (C) phase. Further, since the concentration of functional groups per unit mass of the polymer (B) is higher than the concentration of functional groups per unit mass of the polymer (C), a larger amount of filler (A) is distributed to the polymer (B) phase. Thus, a specific feature of the polymer composition according to one embodiment of the invention is that a larger amount of filler (A) can be distributed to the polymer (B) phase while both of the polymer (B) and the polymer (C) are modified by the functional group capable of interacting with the filler (A). In this way, it is possible to produce a tire which excels not only in the low loss property and abrasion resistance but also in effective balance between the wet grip performance and mechanical properties.

Hereinafter, each component contained in the polymer composition according to one embodiment of the invention will be explained.

1.1. Filler (A)

The polymer composition according to one embodiment of the invention includes the filler (A). The filler (A) is not particularly limited and may be appropriately selected according to the purpose. Examples thereof include silica alone, carbon black alone, a mixture of silica and carbon black, and the like.

The proportion of the filler (A) used is preferably from 30 parts by mass to 130 parts by mass, more preferably from 35 parts by mass to 130 parts by mass, and particularly preferably from 40 parts by mass to 120 parts by mass with respect to 100 parts by mass of the polymer component. When the proportion of the filler (A) used is equal to or higher than the lower limit, sufficient abrasion resistance and wet grip performance are easily obtained, and when the proportion is below the upper limit, sufficient low loss property is easily obtained.

The filler (A) is preferably present in a larger amount in the polymer (B) phase in which the concentration of functional groups capable of interacting with the filler (A) per unit mass is higher than that of the polymer (C) phase. When a larger amount of filler (A) is present in the polymer (B) phase, it is possible to produce a tire which excels not only in the low loss property and abrasion resistance but also in effective balance between the wet grip performance and mechanical properties.

In this case, the filler (A) is preferably present in the polymer (B) phase at 25% by mass or more of the total filler amount. With such a relationship, the low loss property and abrasion resistance tend to be better. The amount of the filler present in the polymer phase is measured by observing the smooth surface of a sample cut by a microtome by using an AFM (manufactured by Hitachi High-Tech Co., Ltd.) in a measurement range of 2 μm×2 μm.

<Silica>

Examples of silica include wet silica (hydrous silicic acid), dry silica (anhydrous silicic acid), calcium silicate and aluminum silicate. Among these, wet silica is preferable. The proportion of silica used is preferably from 30 parts by mass to 130 parts by mass, more preferably 40 parts by mass to 120 parts by mass, and particularly preferably 50 parts by mass to 110 parts by mass with respect to 100 parts by mass of the polymer component. When the proportion of silica used is equal to or greater than the lower limit, sufficient abrasion resistance and wet grip performance can be easily obtained, and when the proportion is equal to or lower than the upper limit, sufficient low loss property can be easily obtained.

Furthermore, the proportion of silica used is preferably 20% by mass or more, more preferably 50% by mass or more, in 100% by mass of the filler component. This range is advantageous in terms of the low loss property, abrasion resistance and wet grip performance.

<Carbon Black>

Carbon black is not particularly limited, and general types thereof that can be blended in the polymer composition can be used, specific examples thereof including GPF, FEF, HAF, ISAF, SAF and the like. Among these, ISAF, SAF and HAF are preferable, and ISAF is more preferable.

The proportion of carbon black used is preferably 0 parts by mass to 130 parts by mass, more preferably 2 parts by mass to 110 parts by mass, with respect to 100 parts by mass of the polymer component.

1.2. Polymer (B)

The polymer composition according to one embodiment of the invention includes the polymer (B) as a polymer component. The polymer (B) includes a repeating unit derived from a conjugated diene compound.

Examples of the conjugated diene compound used for polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene and the like. Among these, 1,3-butadiene, isoprene and 2,3-dimethyl-1,3-butadiene are preferable, and 1,3-butadiene is more preferable. These conjugated diene compounds may be used singly or in combination of two or more thereof.

The polymer (B) may be a homopolymer of a conjugated diene compound, but from the viewpoint of enhancing the strength of the rubber, a copolymer of a conjugated diene compound and an aromatic vinyl compound is preferable.

Examples of the aromatic vinyl compound used for polymerization include styrene, 2-methylstyrene, 3-methylstyrene, 4-methylstyrene, α-methylstyrene, 2,4-dimethylstyrene, 2,4-diisopropylstyrene, 5-tert-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-tert-butylstyrene, 3-tert-butylstyrene, 4-tert-butylstyrene, vinyl xylene, vinyl naphthalene, vinyl pyridine, diphenylethylene, tertiary amino group-containing diphenylethylene (for example, 1-(4-N,N-dimethylaminophenyl)-1-phenylethylene, etc.) and the like. Among these, styrene is preferred. These aromatic vinyl compounds may be used singly or in combination of two or more thereof.

When the polymer (B) is a copolymer of a conjugated diene compound and an aromatic vinyl compound, the polymer (B) is preferably a polymer or copolymer including 70% by mass to 100% by mass of the repeating unit derived from the conjugated diene compound and 0% by mass to 30% by mass of the repeating unit derived from the aromatic vinyl compound, and more preferably a polymer or copolymer including 80% by mass to 100% by mass of the repeating unit derived from the conjugated diene compound and 0% by mass to 20% by mass of the repeating unit derived from the aromatic vinyl compound, where the total number of repeating units in the polymer (B) is taken as 100% by mass. When the polymer (B) is in the above range, it is possible to obtain more excellent low loss property, abrasion resistance, wet grip performance and mechanical properties.

The polymer (B) may have a repeating unit derived from another monomer which is different from the repeating unit derived from a conjugated diene compound and the repeating unit derived from an aromatic vinyl compound. Examples of other monomers include acrylonitrile, methyl (meth)acrylate, ethyl (meth)acrylate, hydroxyethyl (meth) acrylate and the like. The amount of repeating units derived from other monomers is preferably 10% by mass or less, and more preferably 5% by mass or less, when the total of all the repeating units is 100% by mass.

The peak temperature of the tan δ temperature dispersion curve of the polymer (B) is −110° C. or more and less than −30° C., preferably −100° C. or more and −40° C. or less, and more preferably −80° C. or more and −40° C. or less. When the peak temperature of the tan δ temperature dispersion curve of the polymer (B) is less than −110° C., the wet grip performance may be significantly deteriorated, and when the peak temperature is more than −30° C., the rubber properties at low temperature are sometimes significantly deteriorated.

The polymer (B) has a functional group capable of interacting with the filler (A). The "interaction", as referred to herein, refers to the formation of a covalent bond between the molecules or an intermolecular force (for example, electromagnetic forces acting between the molecules such as ion-dipole interaction, dipole-dipole interaction, hydrogen bond, Van der Waals forces, and the like) which are weaker than the covalent bond. The "functional group capable of interacting with the filler (A)" is not particularly limited as long as it is a functional group having an element capable of interacting with the filler (A). For example, it means a functional group having an element capable of interacting with the filler (A), such as nitrogen, sulfur, phosphorus, silicon, oxygen and the like. Among such functional groups, at least one functional group selected from the group consisting of a nitrogen-containing functional group, a silicon-containing functional group, and an oxygen-containing functional group is preferable.

The polymer (B) is not necessarily entirely configured of a polymer (modified polymer) having a functional group capable of interacting with the filler (A), and may be configured of a mixture of the modified polymer and a non-modified polymer.

Further, the concentration of functional groups per unit mass of the polymer (B) is higher than the concentration of functional groups per unit mass of the polymer (C) described hereinbelow. In the polymer composition according to one embodiment of the invention, the polymer (B) and the polymer (C) undergo phase separation, but since both the polymer (B) and the polymer (C) have functional groups capable of interacting with the filler (A), the filler (A) is unevenly distributed to the polymer (B) phase or the polymer (C) phase. However, since the concentration of functional groups per unit mass of the polymer (B) is higher than the concentration of functional groups per unit mass of the polymer (C), a larger amount of the filler (A) is unevenly distributed to the polymer (B) phase. It became clear that when a larger amount of the filler (A) is thus unevenly distributed to the polymer (B) phase, a polymer composition which is particularly excellent in the balance between the low loss property, abrasion resistance, wet grip performance and mechanical properties can be obtained.

The number average molecular weight (Mn) of the polymer (B) is preferably smaller than the number average molecular weight (Mn) of the polymer (C). For example, when the modification rate of the functional groups capable of interacting with the filler (A) of the polymer (B) and the polymer (C) is approximately the same, by realizing such a relationship, it is possible to increase the concentration of functional groups per unit mass of the polymer (B) over the concentration of functional groups per unit mass of the polymer (C). As a result, a larger amount of the filler (A) is unevenly distributed to the polymer (B) phase, and more excellent low loss property, abrasion resistance, wet grip performance and mechanical properties can be easily obtained.

The number average molecular weight (Mn) of the polymer (B) is preferably from 80,000 to 400,000, and more preferably from 100,000 to 300,000. When the number average molecular weight of the polymer (B) is in the above range, more excellent low loss property, abrasion resistance, wet grip performance and mechanical properties can be easily obtained. In addition, the number average molecular weight (Mn) means a polystyrene-converted peak molecular weight (Mn) measured by gel permeation chromatography (GPC).

The amount of the polymer (B) is preferably from 30% by mass to 90% by mass, more preferably from 50% by mass to 80% by mass, based on 100% by mass of the entire polymer component. The advantageous effect of the amount of the polymer (B) being in the above range is that more excellent low loss property, abrasion resistance, wet grip performance and mechanical properties can be obtained.

<Method for Synthesizing Polymer (B)>

The method for synthesizing the polymer (B) is not particularly limited, and methods such as anionic polymerization, coordination polymerization and emulsion polymerization can be used. A modifier for introducing a functional group capable of interacting with the filler (A) into the polymer (B) may be a modifier that reacts with the polymerization active end of anionic polymerization or coordination polymerization, or an amide moiety of a lithium amide compound used as a polymerization initiator. Also, the modifier may be copolymerized as a monomer.

When the polymer (B) is a copolymer having a repeating unit derived from a conjugated diene compound and a repeating unit derived from an aromatic vinyl compound, a copolymer in which 1,3-butadiene and styrene are included in the monomer composition is preferable because of high living ability in anionic polymerization. The abovementioned copolymer preferably has a random copolymerization portion in which the distribution of the conjugated diene compound and the aromatic vinyl compound is irregular, and it may further have a block portion constituted by the conjugated diene compound or the aromatic vinyl compound.

As a polymerization method to be used, any of a solution polymerization method, a gas phase polymerization method and a bulk polymerization method may be used, but the solution polymerization method is particularly preferable. Moreover, a batch system and a continuous system may be used as a polymerization system. When a solution polymerization method is used, a specific polymerization method can be exemplified by a method in which a monomer including a conjugated diene compound is polymerized in an organic solvent in the presence of a polymerization initiator and a randomizer which is optionally used.

As the polymerization initiator, at least one of an alkali metal compound and an alkaline earth metal compound is used. Specific examples thereof include alkyl lithium compounds such as methyl lithium, ethyl lithium, n-propyl lithium, n-butyl lithium, sec-butyl lithium, tert-butyl lithium and the like, 1,4-dilithiobutane, phenyl lithium, stilbene lithium, naphthyl lithium, 1,3-bis(1-lithio-1,3-dimethylpentyl)benzene, 1,3-phenylenebis(3-methyl-1-phenylpentylidene)dilithium, naphthyl sodium, naphthyl potassium, di-n-butyl magnesium, di-n-hexyl magnesium, potassium ethoxide, calcium stearate and the like. Among these, lithium compounds are preferable. The total amount of the polymerization initiator used is preferably 0.2 mmol to 20 mmol per 100 g of the monomer used for the polymerization.

The polymerization reaction may be carried out using, as an initiator, a mixture of at least one of an alkali metal compound and an alkaline earth metal compound and a compound having a functional group that interacts with the filler (A). By carrying out the polymerization in the presence of such a mixture, the polymerization initiation end of the conjugated diene polymer can be modified with a functional group having an interaction with the filler (A). As a compound that is used for modifying the polymerization initiation end and has a functional group that interacts with the filler (A), a nitrogen-containing compound, such as a secondary amine compound, is preferable.

Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperazine, N-(tert-butyldimethylsilyl)piperazine, 1,3-ditrimethylsilyl-1,3,5-triazinan and the like.

When the polymerization is carried out in the presence of the mixture, at least one of an alkali metal compound and an alkaline earth metal compound and a compound having a functional group that interacts with the filler (A) may be mixed in advance, and the mixture may be added to the polymerization system to carry out the polymerization. Alternatively, at least one of an alkali metal compound and an alkaline earth metal compound and a compound having a functional group that interacts with the filler (A) may be added to the polymerization system, and the two may be mixed in the polymerization system to carry out the polymerization. Any of these cases is included in the embodiment of "polymerizing a monomer including a conjugated diene compound in the presence of an initiator including at least one of an alkali metal compound and an alkaline earth metal compound".

The randomizer can be used for the purpose of adjusting the amount of vinyl bonds which represents the amount of vinyl bonds (1,2-bonds and 3,4-bonds) in the polymer. Examples of randomizers include dimethoxybenzene, tetrahydrofuran, dimethoxyethane, diethylene glycol dibutyl ether, diethylene glycol dimethyl ether, 2,2-di(tetrahydrofuryl) propane, 2-(2-ethoxyethoxy)-2-methylpropane, triethylamine, pyridine, N-methylmorpholine, tetramethylethylenediamine and the like. These can be used singly or in combination of two or more thereof.

As the organic solvent used for the polymerization, any organic solvent inert to the reaction may be used, examples thereof including aliphatic hydrocarbons, alicyclic hydrocarbons, aromatic hydrocarbons and the like. Among them, hydrocarbons having 3 to 8 carbon atoms are preferable. Specific examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene and the like. The organic solvents can be used singly or in combination of two or more thereof.

In the case of solution polymerization, the monomer concentration in the reaction solvent is preferably from 5% by mass to 50% by mass, and preferably from 10% by mass to 30% by mass, from the viewpoint of maintaining a balance between productivity and ease of polymerization control. The temperature of the polymerization reaction is preferably −20° C. to 150° C., and more preferably 0° C. to 120° C. Also, the polymerization reaction is preferably carried out under a pressure sufficient to keep the monomers substantially in the liquid phase. Such pressure can be obtained by a method such as pressurizing the inside of a reactor with a gas inert to the polymerization reaction.

The modifier for introducing a functional group capable of interacting with the filler (A) into the polymer (B) preferably has at least one atom selected from a silicon atom, a nitrogen atom and an oxygen atom, and more preferably has a silicon atom and an oxygen atom, a silicon atom and a nitrogen atom, or a silicon atom, an oxygen atom and a nitrogen atom in one molecule.

For example, from the viewpoint of having a high affinity to the filler (A) (for example, silica), the modifier is preferably an alkoxysilane compound. Specific examples of the alkoxysilane compound include 3-dimethylaminopropyltriethoxysilane, N,N-bis (trimethylsilyl)aminopropylmethyldiethoxysilane, bis(diethoxymethylsilylpropyl)-N-methylamine, N-(1,3-dimethylbutylidene)-3-(triethoxysilyl)-1-propanamine, bis(methyldimethoxysilylpropyl)-N-methylamine, bis(trimethoxysilylpropyl)-N-methylamine, bis(diethoxymethylsilylpropyl)-N-methylamine, diethylaminopropyltrimethoxysilane, 1,1'-(1,4-phenylene)bis(N-(3-triethoxysilylpropyl)methanimine, 2,2-dimethoxy-1-(3-trimethoxysilylpropyl)-1-aza-2-silacyclopentane, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, divinyldiethoxysilane, and the like. Among these, 3-dimethylaminopropyltriethoxysilane, N,N-bis(trimethylsilyl)aminopropylmethyldicthoxysilanc, bis(dicthoxymethylsilylpropyl)-N-methylamine, N-(1,3-dimethylbutylidene)-3-(triethoxysilyl)-1-propanamine, 2,2-dimethoxy-1-(3-trimethoxysilylpropyl)-1-aza-2-silacyclopentane, tetraethoxysilane, methyltriethoxysilane and dimethyldiethoxysilane are preferable. These may be used singly or in combination of two or more thereof.

1.3. Polymer (C)

The polymer composition according to one embodiment of the invention includes the polymer (C) as a polymer component. The polymer (C) includes a repeating unit derived from a conjugated diene compound and a repeating unit derived from an aromatic vinyl compound.

The conjugated diene compound used for the polymerization can be exemplified by the same compounds as listed in the description of the polymer (B). Among these, 1,3-butadiene, isoprene and 2,3-dimethyl-1,3-butadiene are preferable, and 1,3-butadiene is more preferable. These conjugated diene compounds may be used singly or in combination of two or more thereof.

The aromatic vinyl compound used for the polymerization can be exemplified by the same compounds as listed in the description of the polymer (B). Among these, styrene is preferable. These aromatic vinyl compounds may be used singly or in combination of two or more thereof.

A copolymer having from 50% by mass to 80% by mass of the repeating units derived from the conjugated diene compound and from 20% by mass to 50% by mass of the repeating units derived from the aromatic vinyl compound, when the total number of the repeating unit in the polymer (C) is taken as 100% by mass, is preferable and a copolymer having from 50% by mass to 70% by mass of the repeating units derived from the conjugated diene compound and from 30% by mass to 50% by mass of the repeating units derived from the aromatic vinyl compound is more preferable. Since the amount of the repeating unit derived from the aromatic vinyl compound in the polymer (B) is thus made different from that in the polymer (C), the polymer (B) and the polymer (C) become incompatible with each other and phase separation occurs in the polymer composition. When the polymer (C) is in the above range, more excellent low loss property, abrasion resistance, wet grip performance and mechanical properties can be obtained.

The polymer (C) may have a repeating unit derived from another monomer which is different from the repeating unit derived from a conjugated diene compound and the repeating unit derived from an aromatic vinyl compound. Examples of other monomers include acrylonitrile, methyl (meth)acrylate, ethyl (meth)acrylate, hydroxyethyl (meth)acrylate and the like. The amount of repeating units derived from other monomers is preferably 10% by mass or less, and more preferably 5% by mass or less, when the total of all the repeating units is 100% by mass.

The polymer (C) preferably has a branched structure. When the polymer (C) has a branched structure, it is possible to obtain more excellent low loss property, abrasion resistance, wet grip performance and mechanical properties.

The peak temperature of the tan δ temperature dispersion curve of the polymer (C) is −30° C. or more and 10° C. or less, preferably −25° C. or more and 5° C. or less, and more preferably −25° C. or more and 0° C. or less. When the peak temperature of the tan δ temperature dispersion curve of the polymer (C) is less than −30° C., the wet grip performance may be significantly deteriorated, and when the peak temperature is more than 10° C., the low loss property at low temperature is sometimes significantly deteriorated.

The polymer (C) has a functional group capable of interacting with the filler (A). The functional group capable of interacting with the filler (A) can be exemplified by functional groups having an element capable of interacting with the filler (A), such as nitrogen, sulfur, phosphorus, silicon, oxygen and the like. It is preferable that at least one among these functional groups be selected from the group consisting of a nitrogen-containing functional group, a silicon-containing functional group, and an oxygen-containing functional group.

The polymer (C) is not necessarily entirely configured of a polymer (modified polymer) having a functional group capable of interacting with the filler (A), and may be configured of a mixture of the modified polymer and a non-modified polymer.

Further, the concentration of functional groups per unit mass of the polymer (C) is lower than the concentration of functional groups per unit mass of the polymer (B) described hereinabove. In the polymer composition according to one embodiment of the invention, the polymer (B) and the polymer (C) undergo phase separation, but since both the polymer (B) and the polymer (C) have functional groups capable of interacting with the filler (A), the filler (A) is unevenly distributed to the polymer (B) phase or the polymer (C) phase. However, since the concentration of functional groups per unit mass of the polymer (C) is lower than the concentration of functional groups per unit mass of the polymer (B), a larger amount of the filler (A) is unevenly distributed to the polymer (B) phase. It became clear that when a larger amount of the filler (A) is thus unevenly distributed to the polymer (B) phase, a polymer composition which is particularly excellent in the balance between the low loss property, abrasion resistance, wet grip performance and mechanical properties can be obtained.

The number average molecular weight (Mn) of the polymer (C) is preferably larger than the number average molecular weight (Mn) of the polymer (B). For example, when the modification rate of the polymer (B) and the polymer (C) is approximately the same, by realizing such a relationship, it is possible to increase the concentration of functional groups per unit mass of the polymer (B) over the concentration of functional groups per unit mass of the polymer (C). As a result, a larger amount of the filler (A) is unevenly distributed to the polymer (B) phase, and more excellent low loss property, abrasion resistance, wet grip performance and mechanical properties can be easily obtained.

The number average molecular weight (Mn) of the polymer (C) is preferably from 200,000 to 1,500,000, and more preferably from 300,000 to 1,100,000. When the number average molecular weight of the polymer (C) is equal to or higher than the lower limit, satisfactory fracture resistance can be easily obtained. Meanwhile, when the number average molecular weight of the polymer (C) is equal to or lower than the upper limit, satisfactory processability is easily obtained. The number average molecular weight (Mn) means a polystyrene-converted peak molecular weight (Mn) measured by gel permeation chromatography (GPC).

The molecular weight distribution of the polymer (C), that is, weight average molecular weight (Mw)/number average molecular weight (Mn), is preferably 1.5 to 2.5, and more preferably 1.5 to 2.2. When the molecular weight distribution of the polymer (C) is in the above range, more excellent low loss property, abrasion resistance, wet grip performance and mechanical properties are easily obtained.

The amount of the polymer (C) is preferably from 10% by mass to 90% by mass and more preferably from 20% by mass to 80% by mass, based on 100% by mass of the entire polymer component. The advantageous effect of the amount of the polymer (C) being in the above range is that more excellent low loss property, abrasion resistance, wet grip performance and mechanical properties can be obtained.

A method for synthesizing the polymer (C) is the same as the method for synthesizing the polymer (B).

1.4. Other Components

The polymer composition according to one embodiment of the invention may use, according to the intended use of the polymer composition, well-known additives such as a silane coupling agent, a crosslinking agent, an acidic compound, an extender oil (process oil), an antiaging agent and a vulcanization accelerator and, as needed, a vulcanization aid, a processing aid, an anti-scorching agent and zinc oxide, a softener, a colorant, a flame retardant, a lubricant, a foaming agent, a plasticizer, an antioxidant, an anti-UV agent, an antistatic agent, an anti-coloring agent, and the like.

<Silane Coupling Agent>

Examples of the silane coupling agent include bis(3-triethoxysilylpropyl) tetrasulfide, bis(3-triethoxysilylpropyl)

trisulfide, bis(3-triethoxysilylpropyl) disulfide, bis(2-triethoxysilylethyl) tetrasulfide, bis(3-trimethoxysilylpropyl) tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane; 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzolyl tetrasulfide, 3-triethoxysilylpropyl methacrylate monosulfide, 3-trimethoxysilylpropyl methacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide, 3-octanoylthio-1-propyltriethoxysilane, and the like. These compounds can be used singly or in combination of two or more thereof. Further, among these, from the viewpoint of the reinforcing property improvement effect etc., bis(3-triethoxysilylpropyl) trisulfide, bis(3-triethoxysilylpropyl) disulfide, and 3-trimethoxysilylpropylbenzothiazolyl tetrasulfide are preferable.

The proportion of the silane coupling agent used is preferably from 0.5 parts by mass to 20 parts by mass with respect to 100 parts by mass of the filler (A). When the proportion of the silane coupling agent used is in the above range, the rubber elastic body formed from the polymer composition can be provided with sufficient reinforcing property and fracture resistance, and the abrasion resistance of the rubber elastic body can be improved.

<Crosslinking Agent>

The crosslinking agent can be exemplified by sulfur, a halogenated sulfur, an organic peroxide, a quinone dioxime, an organic polyhydric amine compound, an alkylphenol resin having a methylol group, and the like. Among these, sulfur is usually used as a crosslinking agent. The proportion of the crosslinking agent used is preferably from 0.1 parts by mass to 10 parts by mass, and more preferably from 0.5 parts by mass to 5 parts by mass with respect to 100 parts by mass of the polymer component.

<Acidic Compound>

A saturated fatty acid having 12 to 24 carbon atoms and a metal salt thereof can be suitably used as the acidic compound. Specific examples of the acidic compound include lauric acid, tridecyl acid, myristic acid, pentadecyl acid, palmitic acid, margaric acid, stearic acid, nonadecyl acid, arachidic acid, heneicosylic acid, behenic acid, tricosylic acid, lignoceric acid, and calcium salts, zinc salts and the like of these saturated fatty acids. These acidic compounds can be used singly or in combination of two or more thereof. Of these, stearic acid is preferred. The use ratio of the acidic compound is preferably from 0.3 parts by mass to 15 parts by mass with respect to 100 parts by mass of the polymer component.

<Other Additives>

Examples of the extender oils include aromatic oils, naphthenic oils, paraffin oils and the like. The use ratio of the extender oil is from 0 parts by mass to 50 parts by mass with respect to 100 parts by mass of the polymer component.

Examples of the antiaging agent include N-(1,3-dimethylbutyl)-N'-phenyl-p-phenylenediamine and the like.

Examples of the vulcanization accelerator include compounds based on guanidine, an aldehyde-amine, an aldehyde-ammonia, thiazole, a sulfonamide, thiourea, thiuram, dithiocarbamate and xanthate. Specific preferred examples of the vulcanization accelerator include sulfonamide-based vulcanization accelerators such as N-cyclohexyl-2-benzothiazylsulfenamide (CBS) and N-tetra-butyl-2-benzothiazylsulfenamide (TBBS). The use ratio of the vulcanization accelerator is appropriately determined in consideration of the type and use ratio of the basic compound, but is preferably from 0.5 parts by mass to 5 parts by mass with respect to 100 parts by mass of the polymer component.

1.5. Method for Producing Polymer Composition

The polymer composition according to one embodiment of the invention can be prepared by kneading the above-described components, for example, by using kneading machines, such as a Plastomill, a Banbury mixer, a roll, an internal mixer and the like.

For example, the following preparation method is preferably used.

<First Step>

In the first step, it is preferable that the filler (A) and, if necessary, a silane coupling agent be kneaded together with the polymer (B) and the polymer (C). In the first step, if necessary, other polymers (polymers other than the polymer (B) and the polymer (C)), an extender oil, an antiaging agent and the like are also kneaded. Moreover, in the first step, acidic compounds which are preferably kneaded in the second step may be also kneaded.

By providing the filler (A) in the first step, the dispersibility of the filler (A) is likely to be improved, and fuel consumption reducing ability of the rubber elastic body formed from the resulting polymer composition may be improved.

When a silane coupling agent is provided in the first step, it is preferable that initially the polymer (B), the polymer (C), the other polymer and the filler (A) be kneaded, and then the silane coupling agent be added and further kneading be performed. Specifically, it is preferable that initially the polymer (B), the polymer (C), the other polymer, the filler (A) and components (specifically, extension oil, an acidic compound, an antiaging agent) other than the silane coupling agent, among the components that are provided, if necessary, in the first step, be kneaded and then the silane coupling agent be added (post-addition) and further kneading be performed.

As a result of post-addition of the silane coupling agent in the first step, the resulting polymer composition becomes more excellent in processability, and the rubber elastic body formed from the polymer composition has more excellent low hysteresis characteristic. Moreover, when the polymer composition include silica as a filler (A), the dispersibility of silica can be made more favorable.

In the case of post-addition of the silane coupling agent, the timing of addition of the silane coupling agent is determined, as appropriate, in consideration of the proportion of the polymer (B), polymer (C) and other polymer used according to the type of silica, the proportion of silica used, kneading conditions, etc.

Further, in the case of post-addition of the silane coupling agent, the polymer (B), the polymer (C) and other polymer are blended and kneaded for 0.5 min to 10 min, and then the silane coupling agent is added, blended and kneaded for 0.5 min to 10 min.

The kneader to be used in the first step can be exemplified by an open or closed kneader such as a Plastomill, a Banbury mixer, a roll, an internal mixer and the like. In the first step, the kneading temperature is set to 30° C. to 180° C., and preferably to 50° C. to 160° C.

Moreover, when providing a silane coupling agent in the first step, the method of post-adding the silane coupling agent and kneading is not limiting, and a kneaded product including the silane coupling agent may be also obtained by kneading the silane coupling agent simultaneously with all other components provided in the first step. Further, a method may also be used in which a master batch is produced by kneading the polymer (B), silica as the filler (A) and the silane coupling agent, and then adding the polymer (C), other polymer, and additives.

<Second Step>

In the second step, at least a crosslinking agent is added to the kneaded product obtained in the first step, and the kneaded product and the crosslinking agent are kneaded to obtain a polymer composition. In the second step, it is preferable that an acidic compound be kneaded together with the kneaded product obtained in the first step and the crosslinking agent. In the second step, zinc oxide and a vulcanization accelerator are also kneaded, if necessary. In the second step, generally, all the components to be provided in the second step (specifically, the kneaded product obtained in the first step, the crosslinking agent, and if necessary, other components such as the acidic compound, zinc oxide, vulcanization accelerator and the like) are kneaded simultaneously to obtain the polymer composition.

By providing the acidic compound in the second step, the resulting polymer composition becomes more excellent in processability, and the rubber elastic body formed from the polymer composition has more excellent low hysteresis characteristics. Furthermore, the dispersibility of the filler (A) can be further improved.

In the second step, the kneader used in the first step can be used. In the second step, the kneading temperature is set to 30° C. to 130° C., and preferably 50° C. to 110° C.

The polymer composition obtained by the production method is an unvulcanized rubber composition, and a rubber elastic body (crosslinked rubber elastic body) is formed by performing, for example, a crosslinking treatment such as vulcanization.

1.6. Application

The rubber elastic body formed from the polymer composition according to one embodiment of the invention is suitably used as a tire, specifically as a tread of a tire. The tire formed from the polymer composition according to one embodiment of the invention has high strength in the tread and a desired shape in the tread, so that excellent performance is obtained. In addition, the rubber elastic body formed from the polymer composition according to one embodiment of the invention may be used as a tire member other than a tread, an anti-vibration rubber, a fender, a belts, a hose, and other industrial products.

2. EXAMPLES

Specific examples of the invention will be described below, but the invention is not limited to these examples. In addition, "%" in the following synthesis examples, examples, and comparative examples is on a mass basis unless specifically stated otherwise.

2.1. Synthesis Examples of Polymer (B) and Polymer (C)

Synthesis Example of Polymer (B-1)

A total of 2500 g of cyclohexane as a solvent, 11.36 ml of tetrahydrofuran as a vinyl content regulator (randomizer), and 500 g of 1,3-butadiene as a monomer were charged in a nitrogen-substituted autoclave reactor having an inner volume of 5 liters. After adjusting the temperature of the contents of the reactor to 35° C., 5.62 mmol of n-butyllithium as a polymerization initiator was added to initiate polymerization. The polymerization was carried out under adiabatic conditions and the maximum temperature reached 85° C. When a polymerization conversion ratio reached 99% (after 20 min has passed from the start of polymerization), 3.96 g of 2,6-di-tert-butyl-p-cresol was added to the polymer solution including the obtained non-modified conjugated diene-based polymer. Next, the solvent was removed by steam stripping, and drying was performed with a heat roll adjusted to a temperature of 110° C. to obtain a polymer (B-1). Various physical property values and the like of the obtained polymer (B-1) are shown in Table 1.

<Synthesis Example of Polymer (B-2)>

A total of 2500 g of cyclohexane as a solvent, 11.36 ml of tetrahydrofuran as a vinyl content regulator (randomizer), and 500 g of 1,3-butadiene as a monomer were charged in a nitrogen-substituted autoclave reactor having an inner volume of 5 liters. After adjusting the temperature of the contents of the reactor to 35° C., 5.15 mmol of n-butyllithium as a polymerization initiator was added to initiate polymerization. The polymerization was carried out under adiabatic conditions and the maximum temperature reached 85° C. When a polymerization conversion ratio reached 99% (after 20 min has passed from the start of polymerization), 10 g of 1,3-butadiene was added over 2 min, and then 5.03 mmol of N, N-bis(trimethylsilyl)aminopropylmethyldiethoxysilane was added as a modifier and the reaction was conducted for 15 min. Subsequently, 3.96 g of 2,6-di-tert-butyl-p-cresol was added to the polymer solution including the obtained modified conjugated diene-based polymer. Next, the solvent was removed by steam stripping, and drying was performed with a heat roll adjusted to a temperature of 110° C. to obtain a polymer (B-2). Various physical property values and the like of the obtained polymer (B-2) are shown in Table 1.

<Synthesis Example of Polymer (B-3)>

The polymerization was carried out in the same manner as in the above "Synthesis Example of Polymer (B-2)" except that 3.51 mmol of n-butyllithium was added as a polymerization initiator, and the solvent was removed from the solution to isolate the polymer, thereby obtaining a polymer (B-3). Various physical property values and the like of the obtained polymer (B-3) are shown in Table 1.

<Synthesis Example of Polymer (B-4)>

A total of 4.20 mmol of hexamethyleneimine, 2500 g of cyclohexane as a solvent, 11.36 ml of tetrahydrofuran as a vinyl content regulator (randomizer), and 500 g of 1,3-butadiene as a monomer were charged in a nitrogen-substituted autoclave reactor having an inner volume of 5 liters. After adjusting the temperature of the contents of the reactor to 35° C., 5.15 mmol of n-butyllithium as a polymerization initiator was added to initiate polymerization. The polymerization was carried out under adiabatic conditions and the maximum temperature reached 85° C. When a polymerization conversion ratio reached 99% (after 20 min has passed from the start of polymerization), 10 g of 1,3-butadiene was added over 2 min, and then 5.03 mmol of 2,2-dimethoxysilyl-1,3-tritrimethoxysilylpropyl-1-aza-2-silacyclopentane was added as a modifier and the reaction was conducted for 15 min. Subsequently, 3.96 g of 2,6-di-tert-butyl-p-cresol was added to the polymer solution including the obtained modified conjugated diene-based polymer. Next, the solvent was removed by steam stripping, and drying was performed with a heat roll adjusted to a temperature of 110° C. to obtain a polymer (B-4). Various physical property values and the like of the obtained polymer (B-4) are shown in Table 1.

<Synthesis Example of Polymer (C-1)>

A total of 2500 g of cyclohexane as a solvent, 4.26 ml of tetrahydrofuran as a vinyl content regulator (randomizer), and 245 g of styrene and 247.5 g of 1,3-butadiene as monomers were charged in a nitrogen-substituted autoclave reactor having an inner volume of 5 liters. After adjusting the temperature of the contents of the reactor to 10° C., 3.28 mmol of n-butyllithium as a polymerization initiator was added to initiate polymerization. The polymerization was carried out under adiabatic conditions and the maximum temperature reached 85° C. When a polymerization conversion ratio reached 99% (after 20 min has passed from the start of polymerization), 2.5 g of 1,3-butadiene was added over 2 min, and the reaction was conducted for 15 min. Subsequently, 3.96 g of 2,6-di-tert-butyl-p-cresol was added to the polymer solution including the obtained non-modified conjugated diene-based polymer. Next, the solvent was removed by steam stripping, and drying was performed with a heat roll adjusted to a temperature of 110° C. to obtain a polymer (C-1). Various physical property values and the like of the obtained polymer (C-1) are shown in Table 1.

<Synthesis Example of Polymer (C-2)>

A total of 2500 g of cyclohexane as a solvent, 11.36 ml of tetrahydrofuran as a vinyl content regulator (randomizer), and 245 g of styrene and 247.5 g of 1,3-butadiene as monomers were charged in a nitrogen-substituted autoclave reactor having an inner volume of 5 liters. After adjusting the temperature of the contents of the reactor to 35° C., 3.28 mmol of n-butyllithium as a polymerization initiator was added to initiate polymerization. The polymerization was carried out under adiabatic conditions and the maximum temperature reached 85° C. When a polymerization conversion ratio reached 99% (after 20 min has passed from the start of polymerization), 10 g of 1,3-butadiene was added over 2 min, and then 2.06 mmol of N, N-bis(trimethylsilyl) aminopropylmethyldiethoxysilane was added as a modifier and the reaction was conducted for 15 min. Subsequently, 3.96 g of 2,6-di-tert-butyl-p-cresol was added to the polymer solution including the obtained modified conjugated diene-based polymer. Next, the solvent was removed by steam stripping, and drying was performed with a heat roll adjusted to a temperature of 110° C. to obtain a polymer (C-2). Various physical property values and the like of the obtained polymer (C-2) are shown in Table 1.

<Synthesis Example of Polymer (C-3)>

The polymerization was carried out in the same manner as in the above "Synthesis Example of Polymer (C-2)" except that 3.51 mmol of n-butyllithium was added as a polymerization initiator, and the solvent was removed from the solution to isolate the polymer, thereby obtaining a polymer (C-3). Various physical property values and the like of the obtained polymer (C-3) are shown in Table 1.

<Synthesis Example of Polymer (C-4)>

The polymerization was carried out in the same manner as in the above "Synthesis Example of Polymer (C-2)" except that 225 g of styrene and 275 g of 1.3-butadiene were added as monomers, and the solvent was removed from the solution to isolate the polymer, thereby obtaining a polymer (C-4). Various physical property values and the like of the obtained polymer (C-4) are shown in Table 1.

<Synthesis Example of Polymer (C-5)>

The polymerization was carried out in the same manner as in the above "Synthesis Example of Polymer (C-2)" except that 2.23 mmol of bis(diethoxymethylsilylpropyl)-N-methylamine was added instead of N,N-bis(trimethylsilyl)aminopropylmethyldiethoxysilane as a modifier, and the solvent was removed from the solution to isolate the polymer, thereby obtaining a polymer (C-5). Various physical property values and the like of the obtained polymer (C-5) are shown in Table 1.

<Measurement of Number Average Molecular Weight>

For each polymer produced above, the number average molecular weight (Mn) in terms of polystyrene was calculated from the retention time corresponding to the apex of the maximum peak of the GPC curve obtained under the following GPC conditions by using gel permeation chromatography (GPC) ("HLC-8120" manufactured by Tosoh Corporation).

GPC Conditions

Column: product name "GMHXL" (made by Tosoh Corporation), two columns

Column temperature: 40° C.

Mobile phase: tetrahydrofuran

Flow velocity: 1.0 ml/min

Sample concentration: 10 mg/20 ml

<Bonded Styrene Amount>

Bonded styrene content (wt %): measured by $^1$H-NMR measurement at 400 MHz.

<Concentration of Functional Groups Per Unit Mass>

The concentration of functional groups per unit mass (mmol/g) was calculated from the number of moles of functional groups of the added modifier and the amount of the obtained polymer.

2.2. Examples 1 to 4 and Comparative Examples 1 to 4

2.2.1. Production of Polymer Composition and Rubber Elastic Body

The components were compounded according to the composition formulation shown in Table 1, and a polymer composition was manufactured by kneading. The kneading was performed by the following method.

A Plastomill (internal volume: 250 ml) equipped with a temperature controller was used, and as a first step (kneading of the first stage), the components compounded according to Table 1, that is, all the components that have to be provided in the first step, were simultaneously kneaded. Then, as a second step (kneading of the second stage), the kneaded product obtained in the first step was cooled to room temperature, the components were then added and compounded according to Table 1 in a Plastomill (internal volume: 250 ml) equipped with a temperature controller, and kneading was performed under the conditions of a revolution speed of 60 rpm and a kneading time of 1.5 min to obtain the polymer compositions of Examples 1 to 4 and Comparative Examples 1 to 4.

Next, each of the obtained polymer compositions was molded, and vulcanization molding was performed with a vulcanization press at 160° C. for a predetermined time to obtain respective rubber elastic bodies having a predetermined shape which are to be subjected to the following evaluation tests.

2.2.2. Evaluation of Polymer Compositions and Rubber Elastic Bodies

The following evaluation tests were performed with respect to each obtained polymer composition and rubber elastic body. The results are shown in Table 1.

<Measurement of Peak Temperature of tan δ Temperature Dispersion Curve of Polymer (B) Phase and Polymer (C) Phase>

The obtained rubber elastic body was used as a measurement sample, and measurements were performed using an ARES viscoelasticity test apparatus (manufactured by TA Instruments) under the conditions of temperature −120° C. to 10° C., tensile dynamic strain 0.14%, angular velocity 100 radians per second, temperature 10° C. to 100° C., tensile dynamic strain 0.70%, and angular velocity 100 radians per second. The peak temperature of the temperature dispersion curve was determined.

<Low Hysteresis Loss Characteristic Evaluation Test>

The obtained rubber elastic body was used as a measurement sample, and a 50° C. tan δ was measured using an ARES viscoelasticity test apparatus (manufactured by TA Instruments) under the conditions of shear dynamic strain 3.0%, angular velocity 100 radians per second, and 50° C. In Table 1, the measured value of 50° C. tan δ is shown by an index in the case where the measured value according to Comparative Example 1 (specifically, the measured value of the rubber elastic body formed from the polymer composition of Comparative Example 1) was taken as 100 as a reference. A larger numerical value of 50° C. tan corresponds to a smaller and better low hysteresis loss characteristic.

<Abrasion Resistance Evaluation Test>

The obtained rubber elastic body was used as a measurement sample, and measurements were performed at 25° C. under a load of 10 N according to JIS K 6264-2: 2005 by using a DIN abrasion tester (manufactured by Toyo Seiki Co., Ltd.). In Table 1, the measured value is shown by an index in the case where the measured value according to Comparative Example 1 (specifically, the measured value of the rubber elastic body formed from the polymer composition of Comparative Example 1) was taken as 100 as a reference. A larger numerical value corresponds to a better abrasion resistance.

<Wet Grip Performance Evaluation Test>

The obtained rubber elastic body was used as a measurement sample, and measurements were performed using an ARES viscoelasticity test apparatus (manufactured by TA Instruments) under the conditions of tensile dynamic strain 0.14%, angular velocity 100 radians per second, and 0° C. In Table 1, the measured value of 0° C. tan is shown by an index in the case where the measured value according to Comparative Example 1 (specifically, the measured value of the rubber elastic body formed from the polymer composition of Comparative Example 1) was taken as 100 as a reference. A larger numerical value of 0° C. tan δ corresponds to larger and better wet grip performance.

<Tensile Strength Evaluation Test>

The obtained rubber elastic body was used as a measurement sample, and measurements were performed at a temperature of 25° C. according to JIS K6251: 2010. The tensile strength is shown by an index in the case where the measured value according to Comparative Example 1 (specifically, the measured value of the rubber elastic body formed from the polymer composition of Comparative Example 1) was taken as 100 as a reference. A larger value corresponds to a larger tensile strength, and a larger numerical value is preferable.

<Filler Distribution Ratio to Polymer (B) Phase (% by mass)>

Figure 2:
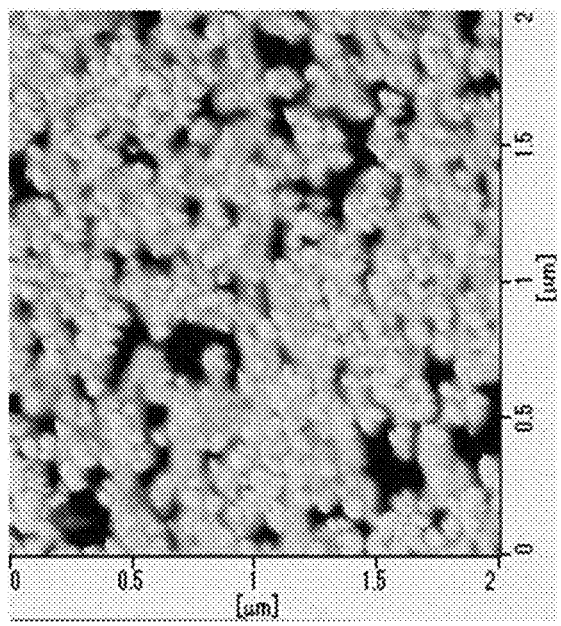
FIG. 2 is an atomic force microscope (AFM) image of a rubber elastic body prepared in Comparative Example 4.

The obtained rubber elastic body was used as a measurement sample, and the smooth surface of the sample cut by a microtome was measured in a measurement range of 2 μm×2 μm by using an AFM (s-image manufactured by Hitachi High-Tech Co., Ltd.). The image obtained in Example 1 is shown in FIG. 1, and the image obtained in Comparative Example 4 is shown in FIG. 2. The filler area contained in each of the two types of polymer components was determined based on a ternarized image obtained by converting the image thus obtained into a ternarized image for two polymer components and the filler component from a histogram, and the distribution ratio of the filler was calculated from the total amount of the filler. When the filler was present at the interface between two polymer components, two points where the three components (two polymer components and the filler) were in contact were connected to divide the area of the filler.

2.3. Evaluation Results

Table 1 shows the components of each polymer composition and the evaluation results.

TABLE 1

| | | | | Example 1 | Example 2 | Example 3 | Example 4 | Comparative Example 1 |
|---|---|---|---|---|---|---|---|---|
| Components of polymer composition | First step | Filler (A) | Silica (parts by mass) | 50 | 50 | 50 | 50 | 50 |
| | | Polymer (B) | Polymer (B-1) (parts by mass) | | | | | 35 |
| | | | Polymer (B-2) (parts by mass) | 35 | 35 | | | |
| | | | Polymer (B-3) (parts by mass) | | | | 35 | |
| | | | Polymer (B-4) (parts by mass) | | | 35 | | |
| | | Polymer (C) | Polymer (C-1) (parts by mass) | | | | | 35 |
| | | | Polymer (C-2) (parts by mass) | 35 | | 35 | | |
| | | | Polymer (C-3) (parts by mass) | | | | 35 | |
| | | | Polymer (C-4) (parts by mass) | | | | | |
| | | | Polymer (C-5) (parts by mass) | | 35 | | | |
| | | | Other polymer (parts by mass) | 30 | 30 | 30 | 30 | 30 |
| | | | Extender oil (parts by mass) | 10 | 10 | 10 | 10 | 10 |
| | | | Silane coupling agent (parts by mass) | 4 | 4 | 4 | 4 | 4 |
| | | | Stearic acid (parts by mass) | 2 | 2 | 2 | 2 | 2 |
| | | | Antiaging agent (parts by mass) | 1 | 1 | 1 | 1 | 1 |
| | Second step | | Zinc oxide (parts by mass) | 3 | 3 | 3 | 3 | 3 |
| | | | Vulcanization accelerator D (parts by mass) | 1.5 | 1.5 | 1.5 | 1.5 | 1.5 |
| | | | Vulcanization accelerator CZ (parts by mass) | 1.8 | 1.8 | 1.8 | 1.8 | 1.8 |
| | | | Sulfur (parts by mass) | 1.5 | 1.5 | 1.5 | 1.5 | 1.5 |

TABLE 1-continued

|  |  | Example | Example | Example | Example | Comparative Example 1 |
|---|---|---|---|---|---|---|
| Number average molecular weight (Mn) (×10⁴) | Polymer (B) | 20 | 20 | 20 | 30 | 20 |
|  | Polymer (C) | 40 | 40 | 40 | 30 | 40 |
|  | Other polymer | 15 | 15 | 15 | 15 | 15 |
| Weight average molecular weight (Mw) (×10⁴) | Polymer (B) | 26 | 26 | 26 | 26 | 26 |
|  | Polymer (C) | 60 | 60 | 60 | 45 | 60 |
|  | Other polymer | 63 | 63 | 63 | 63 | 63 |
| Bonded styrene amount (% by weight) | Polymer (B) | 0 | 0 | 0 | 0 | 0 |
|  | Polymer (C) | 50 | 50 | 50 | 50 | 50 |
| Concentration of functional groups per unit mass (mmol/g) | Polymer (B) | 0.010 | 0.010 | 0.010 | 0.010 | 0 |
|  | Polymer (C) | 0.004 | 0.004 | 0.004 | 0.005 | 0 |
| tanδ peak temperature (° C.) | low-tanδ temperature | −59 | −60 | −60 | −63 | −60 |
|  | high-tanδ temperature | 1 | 2 | 1 | 2 | 2 |
| Filler distribution ratio to phase with low-tanδ temperature (% by mass) |  | 78 | 65 | 63 | 51 | 69 |
| Evaluation tests | Low hysteresis loss characteristic | 214 | 226 | 213 | 196 | 100 |
|  | Abrasion resistance | 113 | 122 | 112 | 114 | 100 |
|  | Wet grip property | 124 | 125 | 116 | 116 | 100 |
|  | Tensile strength | 130 | 130 | 122 | 127 | 100 |

|  |  |  |  | Comparative Example 2 | Comparative Example 3 | Comparative Example 4 |
|---|---|---|---|---|---|---|
| Components of polymer composition | First step | Filler (A) | Silica (parts by mass) | 50 | 50 | 50 |
|  |  | Polymer (B) | Polymer (B-1) (parts by mass) |  | 35 |  |
|  |  |  | Polymer (B-2) (parts by mass) | 35 |  |  |
|  |  |  | Polymer (B-3) (parts by mass) |  |  |  |
|  |  |  | Polymer (B-4) (parts by mass) |  |  |  |
|  |  | Polymer (C) | Polymer (C-1) (parts by mass) | 35 |  |  |
|  |  |  | Polymer (C-2) (parts by mass) |  | 35 |  |
|  |  |  | Polymer (C-3) (parts by mass) |  |  |  |
|  |  |  | Polymer (C-4) (parts by mass) |  |  | 70 |
|  |  |  | Polymer (C-5) (parts by mass) |  |  |  |
|  |  | Other polymer (parts by mass) |  | 30 | 30 | 30 |
|  |  | Extender oil (parts by mass) |  | 10 | 10 | 10 |
|  |  | Silane coupling agent (parts by mass) |  | 4 | 4 | 4 |
|  |  | Stearic acid (parts by mass) |  | 2 | 2 | 2 |
|  |  | Antiaging agent (parts by mass) |  | 1 | 1 | 1 |
|  | Second step | Zinc oxide (parts by mass) |  | 3 | 3 | 3 |
|  |  | Vulcanization accelerator D (parts by mass) |  | 1.5 | 1.5 | 1.5 |
|  |  | Vulcanization accelerator CZ (parts by mass) |  | 1.8 | 1.8 | 1.8 |
|  |  | Sulfur (parts by mass) |  | 1.5 | 1.5 | 1.5 |
| Number average molecular weight (Mn) (×10⁴) |  | Polymer (B) |  | 20 | 20 | — |
|  |  | Polymer (C) |  | 40 | 40 | 30 |
|  |  | Other polymer |  | 15 | 15 | 15 |
| Weight average molecular weight (Mw) (×10⁴) |  | Polymer (B) |  | 26 | 26 | — |
|  |  | Polymer (C) |  | 60 | 60 | 45 |
|  |  | Other polymer |  | 63 | 63 | 63 |
| Bonded styrene amount (% by weight) |  | Polymer (B) |  | 0 | 0 | — |
|  |  | Polymer (C) |  | 50 | 50 | 45 |
| Concentration of functional groups per unit mass (mmol/g) |  | Polymer (B) |  | 0.010 | 0 | — |
|  |  | Polymer (C) |  | 0 | 0.004 | 0.005 |
| tanδ peak temperature (° C.) |  | low-tanδ temperature |  | −55 | −64 | −75 |
|  |  | high-tanδ temperature |  | 1 | 4 | −6 |
| Filler distribution ratio to phase with low-tanδ temperature (% by mass) |  |  |  | 88 | 37 | 11 |
| Evaluation tests |  | Low hysteresis loss characteristic |  | 167 | 127 | 180 |
|  |  | Abrasion resistance |  | 102 | 111 | 93 |
|  |  | Wet grip property |  | 101 | 121 | 118 |
|  |  | Tensile strength |  | 111 | 111 | 123 |

In Table 1, the numerical value of each component in the polymer composition represents parts by mass. Further, the following commercial products were used for each material shown in Table 1.

Silica: manufactured by Rhodia, trade name "ZEOSIL 1165MP"

Other polymer: non-modified polybutadiene rubber, manufactured by JSR Corporation, trade name "BR01"

Extender oil: manufactured by Japan Energy Corporation, trade name "JOMO PROCESS NC-140"

Silane coupling agent: manufactured by Evonik Industries AG, trade name "Si75"

Antiaging agent: manufactured by Seiko Chemical Co., Ltd., trade name "OZONONE 6C", N-(1,3-dimethylbutyl)-N'-phenyl-p-phenylenediamine Vulcanization accelerator D: manufactured by Ouchi Shinko Chemical Industry Co., Ltd., trade name "NOCCELER D", 1,3-diphenylguanidine Vulcanization accelerator CZ: manufactured by Ouchi Shinko Chemical Co., Ltd., trade name "NOCCELER CZ", N-cyclohexyl-2-benzothiazolylsulfenamide Based on the results of Table 1, it was confirmed that the polymer compositions according to Examples 1 to 4 excel in low loss property, wet grip property, abrasion resistance, and mechanical properties.

The invention is not limited to the above embodiments, and various modifications are possible. The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A polymer composition comprising:
    a filler (A);
    a polymer (B) having a repeating unit derived from a conjugated diene compound, having a peak temperature of a tan δ temperature dispersion curve of −110° C. or more and less than −30° C., and having a functional group capable of interacting with the filler (A); and
    a polymer (C) having a repeating unit derived from a conjugated diene compound and a repeating unit derived from an aromatic vinyl compound, having a peak temperature of a tan δ temperature dispersion curve of −30° C. or more and 10° C. or less, and having a functional group capable of interacting with the filler (A),
    the polymer (B) and the polymer (C) being incompatible with each other, and
    a concentration of functional groups per unit mass of the polymer (B) being higher than a concentration of functional groups per unit mass of the polymer (C).

2. The polymer composition according to claim 1, wherein a number average molecular weight (Mn) of the polymer (C) is higher than a number average molecular weight (Mn) of the polymer (B).

3. The polymer composition according to claim 1,
    wherein a number average molecular weight (Mn) of the polymer (B) is from 80,000 to 400,000, and
    wherein a number average molecular weight (Mn) of the polymer (C) is from 200,000 to 1,500,000.

4. The polymer composition according to claim 1, wherein the functional group capable of interacting with the filler (A) is at least one functional group selected from a group consisting of a nitrogen-containing functional group, a silicon-containing functional group, and an oxygen-containing functional group.

5. The polymer composition according to claim 1, wherein the polymer (C) has a branched structure.

6. The polymer composition according to claim 1, wherein the filler (A) is present in a larger amount in a phase having a low tan δ peak temperature than in a phase having a high tan δ peak temperature.

7. The polymer composition according to claim 1, wherein the polymer (B) includes from 70% by mass to 100% by mass of the repeating unit derived from the conjugated diene compound and from 0% by mass to 30% by mass of the repeating unit derived from the aromatic vinyl compound, when the total number of repeating units is taken as 100% by mass.

8. The polymer composition according to claim 1, wherein the polymer (C) includes from 50% by mass to 80% by mass of the repeating unit derived from the conjugated diene compound and from 20% by mass to 50% by mass of the repeating unit derived from the aromatic vinyl compound, when the total number of repeating units is taken as 100% by mass.

9. The polymer composition according to claim 1, wherein the conjugated diene compound is 1,3-butadiene.

10. The polymer composition according to claim 1, wherein the aromatic vinyl compound is styrene.

11. The polymer composition according to claim 1, wherein the polymer (C) has a molecular weight distribution (Mw/Mn) of 1.5 to 2.5.

12. A tire in which the polymer composition according to claim 1 is used for a tread member.

* * * * *